(12) United States Patent
Ndiaye

(10) Patent No.: US 7,216,226 B2
(45) Date of Patent: May 8, 2007

(54) UNIQUE AND SECURE IDENTIFICATION OF A NETWORKED COMPUTING NODE

(75) Inventor: Baila Ndiaye, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 865 days.

(21) Appl. No.: 10/113,073

(22) Filed: Apr. 1, 2002

(65) Prior Publication Data

US 2003/0188161 A1    Oct. 2, 2003

(51) Int. Cl.
*H04L 9/00* (2006.01)
(52) U.S. Cl. ............................ 713/155; 713/168
(58) Field of Classification Search .............. 713/201, 713/155, 150–153, 163, 168–171, 154, 160, 713/161, 191, 181; 380/28, 29, 30, 259, 380/255, 278; 705/64; 726/12–14, 2, 3, 726/4; 709/220–222, 230; 370/254
See application file for complete search history.

(56) References Cited

U.S. PATENT DOCUMENTS

| | | | | |
|---|---|---|---|---|
| 5,579,393 A * | 11/1996 | Conner et al. | ............... | 713/176 |
| 5,999,629 A * | 12/1999 | Heer et al. | ............... | 705/51 |
| 6,005,943 A * | 12/1999 | Cohen et al. | ............... | 380/30 |
| 6,084,969 A * | 7/2000 | Wright et al. | ............... | 380/271 |
| 6,092,200 A * | 7/2000 | Muniyappa et al. | ............... | 726/15 |
| 6,161,181 A * | 12/2000 | Haynes et al. | ............... | 713/170 |
| 6,185,680 B1 * | 2/2001 | Shimbo et al. | ............... | 713/160 |
| 6,363,365 B1 * | 3/2002 | Kou | ............... | 705/64 |
| 6,389,533 B1 * | 5/2002 | Davis et al. | ............... | 713/162 |
| 6,769,060 B1 * | 7/2004 | Dent et al. | ............... | 713/168 |
| 6,785,816 B1 * | 8/2004 | Kivimaki et al. | ............... | 713/181 |
| 6,857,076 B1 * | 2/2005 | Klein | ............... | 713/189 |
| 6,877,093 B1 * | 4/2005 | Desai et al. | ............... | 713/156 |
| 2002/0004898 A1 * | 1/2002 | Droge | ............... | 713/151 |
| 2002/0080968 A1 * | 6/2002 | Olsson | ............... | 380/270 |
| 2002/0144118 A1 * | 10/2002 | Maruyama | ............... | 713/170 |
| 2002/0199102 A1 * | 12/2002 | Carman et al. | ............... | 713/168 |
| 2003/0018889 A1 * | 1/2003 | Burnett et al. | ............... | 713/153 |
| 2003/0149889 A1 * | 8/2003 | Wookey et al. | ............... | 713/200 |

* cited by examiner

*Primary Examiner*—Kim Vu
*Assistant Examiner*—Nirav Patel
(74) *Attorney, Agent, or Firm*—Richard P. Lange

(57) ABSTRACT

A method and apparatus for unique and secure identification of a computing service node. The service node is coupled to an administrative node and to a certificate authority node via a computer network. The administrative and certificate authority nodes have respective public and private keys. A shared key is established between the certificate authority node and the administrative node, and while booting the service node, the service node generates its public key and private key. The administrative node double encrypts a selected value, first using the shared key and second using the public key of the service node, whereby a double encrypted value is generated. The double encrypted value is decrypted at the service node, whereby a single encrypted value is generated. Whether the certificate authority node is able to successfully decrypt the single encrypted value using the shared key determines whether the administrative node is authentic.

13 Claims, 5 Drawing Sheets

UNIQUE AND SECURE IDENTIFICATION OF A NETWORKED COMPUTING NODE

FIELD OF THE INVENTION

The present invention relates to unique and secure identification of computing nodes that are connected by a network.

BACKGROUND

Networked computing arrangements use various addressing schemes for uniquely identifying the computing nodes on the network. For example, an internet protocol (IP) network uses IP-specific addresses. The unique addresses allow the attached nodes to selectively transmit data to other nodes on the network.

Although IP addresses provide unique identification of nodes on a network, IP addresses can be taken and used for false identification, and are therefore insufficient for securing the identity of a node. The assumption of one node's identification by another node is one way in which confidential information is obtained. With the continued growth of computing arrangements devoted to running a business, for example, selling, developing, and managing, the risks associated with the misappropriation of confidential information are too great to ignore.

One way in which the identity of nodes is protected is by way of certificates and management by a certificate authority (CA). Communicating nodes pass certificates and verify authenticity with the CA. Establishing certificates is generally initiated by manual intervention. For example, when a new node is deployed in a computing environment in which the various nodes are managed by way of an administration node, the new node must be configured with the appropriate certificate in order to communicate with the administration node. Thus, identifying and securing the identity of a node on a network can initially cause delays in deploying the node.

A system and method that address the aforementioned problems, as well as other related problems, are therefore desirable.

SUMMARY OF THE INVENTION

The present invention provides a method and apparatus for unique and secure identification of a computing service node in various embodiments. The service node is coupled to an administrative node and to a certificate authority node via a computer network. The administrative and certificate authority nodes have respective public and private keys. A shared key is established between the certificate authority node and the administrative node, and while booting the service node, the service node generates its public key and private key. The administrative node double encrypts a selected value, first using the shared key and second using the public key of the service node, whereby a double encrypted value is generated. The double encrypted value is decrypted at the service node, whereby a single encrypted value is generated. Whether the certificate authority node is able to successfully decrypt the single encrypted value using the shared key determines whether the administrative node is authentic.

Various example embodiments are set forth in the Detailed Description and claims which follow.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
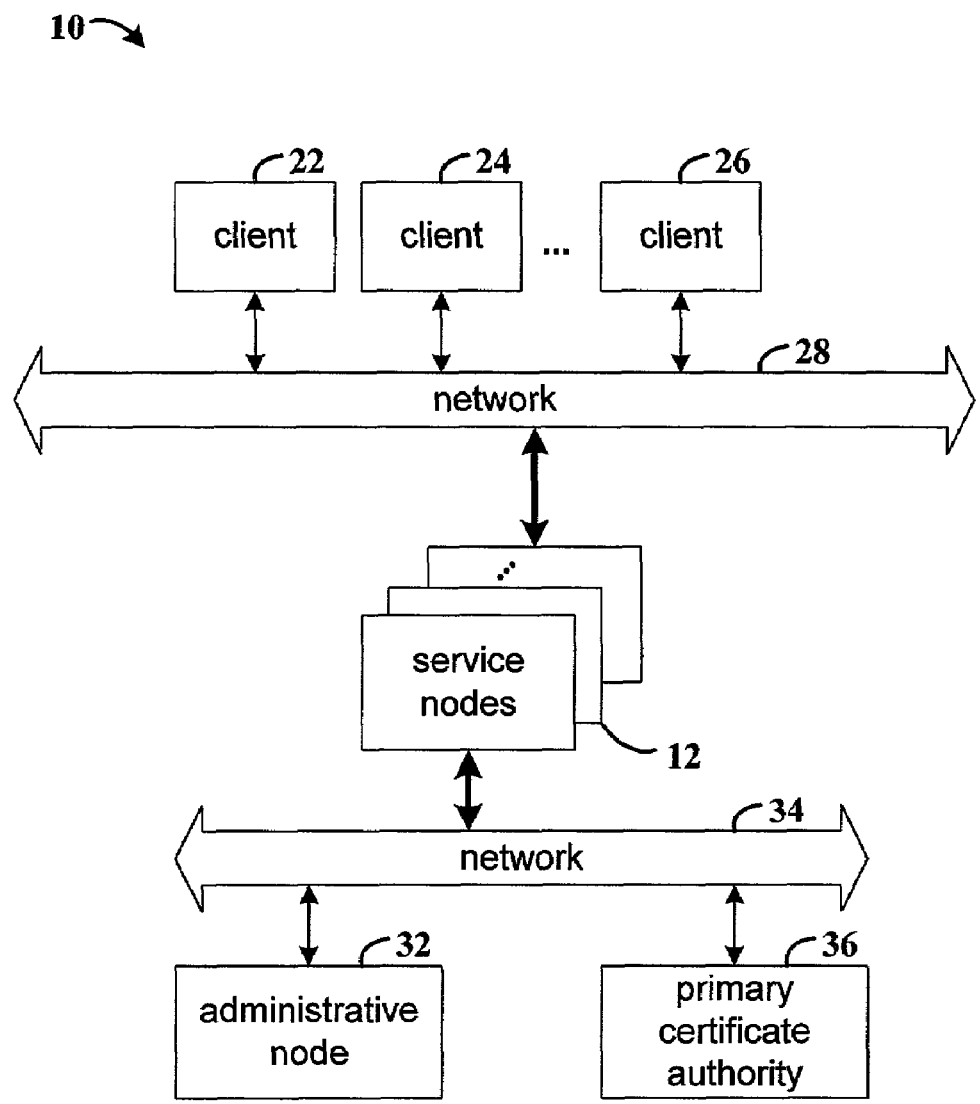
FIG. 1 is a block diagram of an example computing arrangement in which the present invention can be used.

FIG. 1 is a block diagram of an example computing arrangement in which the present invention can be used. Computing arrangement 10 includes a plurality of service nodes 12 that are coupled to clients 22, 24, and 26 via network 28. The configuration and management of the service nodes are performed via administrative node 32, which is coupled to the service nodes via network 34. The primary certificate authority 36 in conjunction with the administrative node manages the authentication of the service nodes. Each of the different types of nodes is a data processing system in the example arrangement 10. In one embodiment, the service nodes are configured as dynamic host configuration protocol (DHCP) clients, and the administrative node 32 is the DHCP server.

The service nodes 12 in the example arrangement provide computing services to the clients 22, 24, and 26. Example services include storage, communication, information or other services. Increasing service capacity in arrangement 10 involves deploying additional ones of service nodes 12. Thus, a new service node must be uniquely identifiable amongst the service nodes, and security measures must be taken to ensure that another node cannot assume the identity of the new node.

With the present invention, a unique, secure identity is automatically established for a service node using public key encryption and certificates. In one embodiment, a service node is configured to automatically generate a public key and a private key while the node is being booted. The keys are automatically generated by and stored within a network interface card, which eliminates manual specification of the keys. After the keys are generated, the service node automatically registers with the administrative node 32.

Registration of a service node with the administrative node also involves interaction with the primary certificate authority 36. The service node initiates the registration process by sending its public key to the administrative node 32, and the administrative node responds with an arbitrary value encrypted using a shared key previously negotiated with the primary certificate authority and the network address of the primary certificate authority encrypted using the service node's public key. The service node decrypts the information returned by the administrative node to obtain the address of the primary certificate authority. The encrypted arbitrary value is then sent to the primary certificate authority. If the primary certificate authority successfully decrypts the arbitrary value, then a response is returned to the service node to indicate successful authentication.

Figure 2:
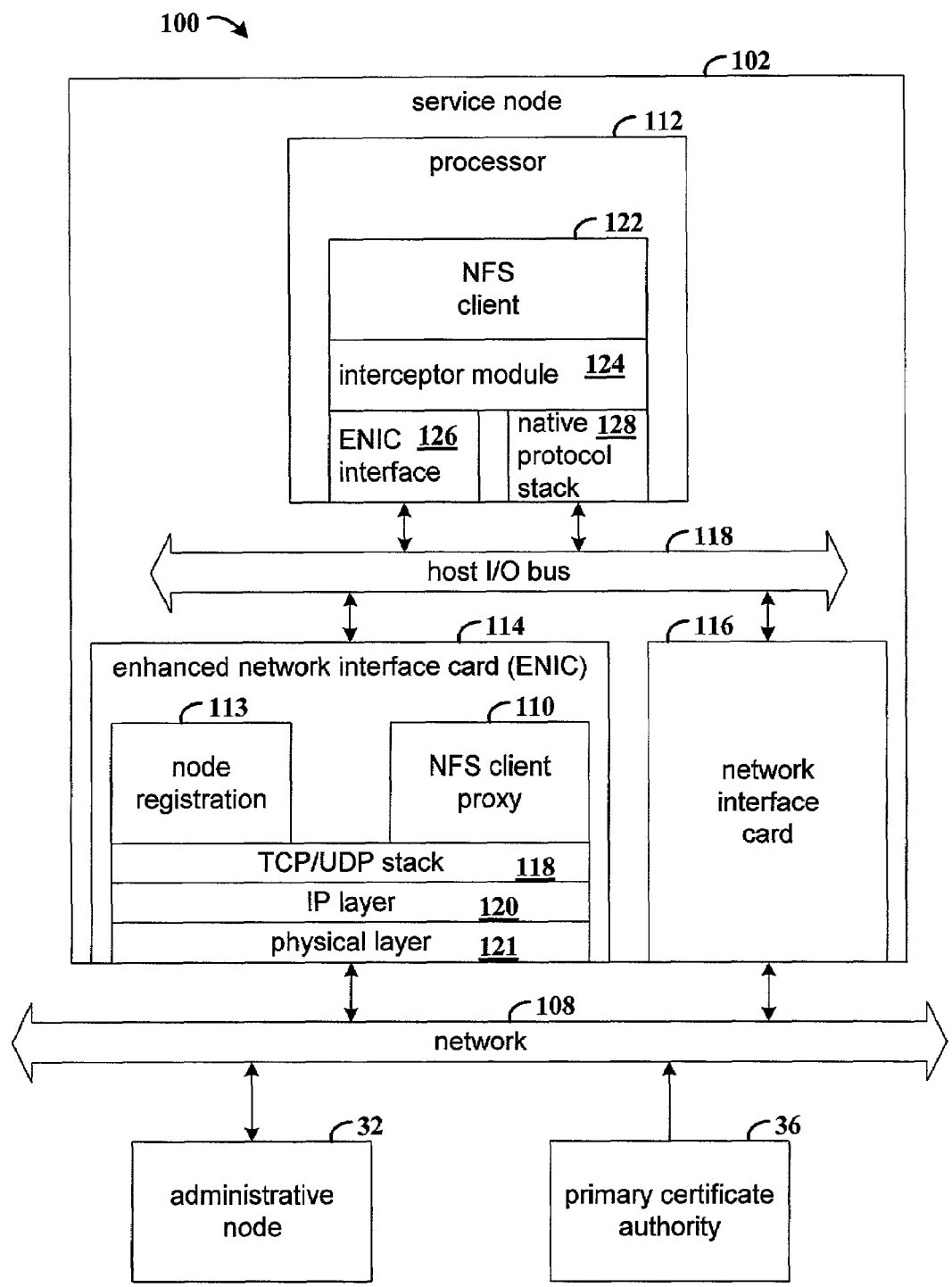
FIG. 2 is a block diagram of a computing arrangement that includes a service node configured with an network interface card having extended functionality in accordance with an example embodiment of the invention.

FIG. 2 is a block diagram of a computing arrangement that includes a service node configured with a network interface card having extended functionality in accordance with an example embodiment of the invention. System 100 includes a service node 102 that is coupled to administrative node 32 and primary certificate authority via network 108.

Client system 102 includes a processor 112 that is coupled to the enhanced network interface card (ENIC) 114 and a conventional network interface card (NIC) 116 via the host I/O bus 118 (e.g., PCI bus). ENIC 114 includes functionality beyond the physical interface to the network. For example, node registration logic 113 is implemented on the ENIC. The node registration logic generates the public and private keys for the service node and performs the registration activities with the administrative node 32 and the primary certificate authority 36. The capability to automatically generate the keys eliminates the need to manually distribute keys to the various service nodes.

In another embodiment, an NFS client proxy 110 is implemented on the ENIC, along with the TCP/UDP stack 118, IP layer 120, and physical layer 121. The NFS client proxy implements functional extensions added to the standard NFS protocol. Network interface card 116 provides a standard interface for client system 102 to the network 108. For example, network interface card 116 may be any one of a number of commercially available cards for connecting a Unix, Linux, NT, or Windows based machine to a network.

Processor 112 executes software elements such as NFS client 122, interceptor module 124, ENIC interface 126, and native protocol stack 128. NFS client is an example application that makes NFS-RPC calls. Interceptor module 124 is a software module that works in conjunction with ENIC 114. The function of interceptor module 124 is to intercept RPC calls, and depending on the particular procedure referenced, direct the call to either ENIC interface 126 or to native protocol stack 128 for processing. NFS-specific RPC calls are directed to ENIC interface 126, and other RPC calls are directed to native protocol stack 128.

Further details regarding an example implementation of ENIC 114 can be found in the application/patent entitled, "PROCESSING NETWORK PACKETS", by Russell et al., filed on Aug. 11, 2000, having application/patent Ser. No. 09/630,033, and assigned to the assignee of the present invention. The contents of the application/patent are incorporated herein by reference. The ENIC supports implementation of the lower layers of the standard NFS client protocol, along with any extensions to the standard protocol. Further information on implementation of NFS extensions on ENIC 114 is found in the application/patent entitled, "EXTENDING A STANDARD-BASED REMOTE FILE ACCESS PROTOCOL AND MAINTAINING COMPATIBILITY WITH A STANDARD PROTOCOL STACK", by Karamanolis et al., filed on Jan. 31, 2001, having application/patent Ser. No. 09/774,841, and assigned to the assignee of the present invention; the contents of which are incorporated herein by reference.

Figure 3:
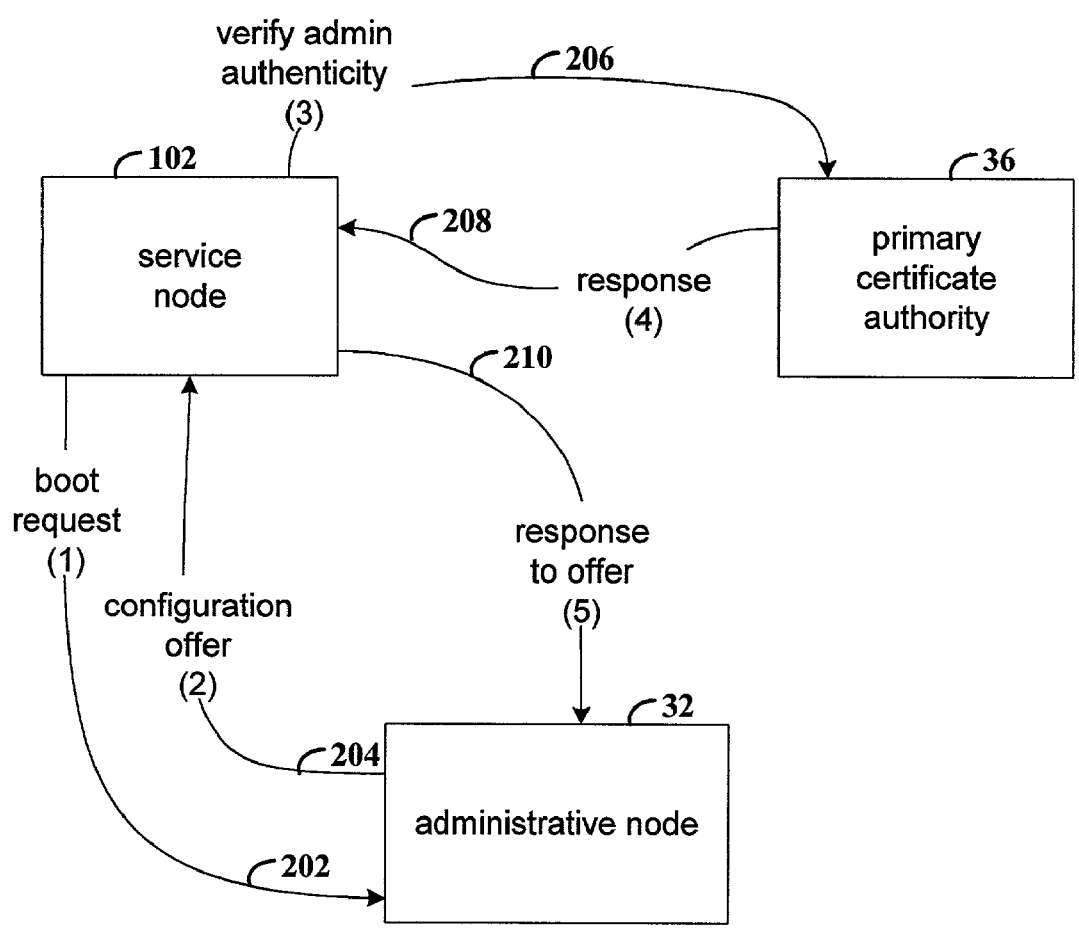
FIG. 3 is a block diagram that illustrates an example data flow between a service node, an administrative node, and a primary certificate authority.

FIG. 3 is a block diagram that illustrates an example data flow between a service node, an administrative node, and a primary certificate authority. During the boot process of service node 102, the service node generates its public and private keys and sends a boot request (line 202) to administrative node 32. The boot request includes the service node's public key and provides an indication to the administrative node that the service node is available to provide additional capacity in the environment.

The administrative node responds to the boot request with a configuration offer (line 204). The configuration offer includes an encrypted network address of the primary certificate authority 36, a double encrypted arbitrary value, and data relating to the proposed configuration of the service node. The network address is encrypted using the public key provided by the service node, and the arbitrary value is encrypted first using a shared key previously negotiated between the primary certificate authority and the administrative node and second using the public key of the service node 102. The data relating to the proposed configuration is encrypted using the public key of the service node and is implementation dependent.

When the service node receives the configuration offer from the administrative node, the service node decrypts the address of the primary certificate authority, the arbitrary value, and the data describing the proposed configuration. The service node then sends the arbitrary value (still singly encrypted between the administrative node and the primary certificate authority) to the primary certificate authority (line 206). The primary certificate authority decrypts the arbitrary value and returns a response to the service node (line 208). The response to the service node indicates whether the primary certificate authority successfully decrypted the arbitrary value from the administrative node, that is, whether the administrative node has been authenticated. Depending on successful authentication and other application-specific factors, the service node responds to the configuration offer (line 210).

Figure 4:
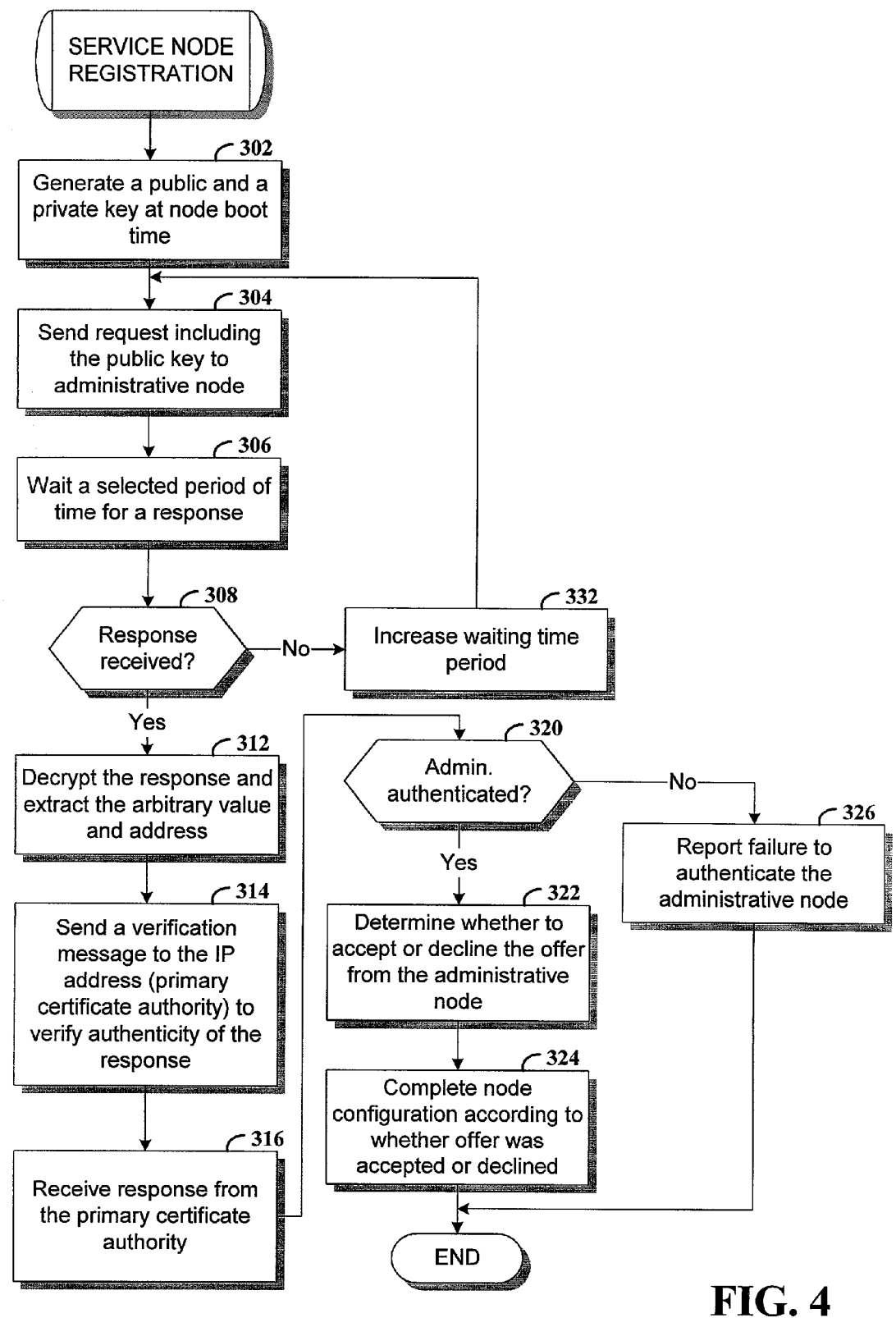
FIG. 4 is a flowchart of an example process performed by a service node in registering a unique and secure identity with an administrative node in accordance with one embodiment of the invention.

FIG. 4 is a flowchart of an example process performed by a service node in registering a unique and secure identity with an administrative node in accordance with one embodiment of the invention. The service node generates its public and private keys during its boot process (step 302). In one embodiment, the keys are generated by software executing in the enhanced network interface card using a commercially available software library. Example encryption algorithms implemented by the software include RSA, Digital Signature, PAK, and ESIGN. The keys are stored in the ENIC 114.

The service node then sends a boot request, which includes the node's public key, to the administrative node (step 304) and waits for a response (step 306). Once a response is received, the process continues (decision step 308) with decryption of the information from the administrative node (step 312). The decrypted information includes the address of the primary certificate authority, the arbitrary value encrypted using the key shared with the primary certificate authority, and the data that indicate the proposed configuration. In one embodiment, the service node is configured as a DHCP client and obtains the keys of the administrative node during DHCP configuration.

Authentication is then performed with the primary certificate authority as referenced by the address from the administrative node. The arbitrary value encrypted by the administrative node is sent to the primary certificate authority (step 314). Upon receiving a response from the primary certificate authority (step 316), the service node determines whether the administrative node is authenticated (decision step 320). If the administrative node is authenticated (the primary certificate authority successfully decrypted the arbitrary value), the service node then determines whether to accept or decline the offer of configuration. The criteria used to determine whether to accept the configuration is application dependent. For example, in an arrangement where there are multiple administrative servers and the service node generates multiple boot requests, the criteria may be to accept the offer from the administrative node that is authenticated first. The service node completes its configuration in accordance with whether the configuration offer was accepted or declined (step 324).

If the administrative node is not authenticated (the primary certificate authority could not decrypt the arbitrary value), then the failure is reported (step 326). For example, the failure may be reported to a system administrator in the form of a log file entry, email message, or an audible alarm, depending on application requirements.

Returning the discussion to where the process is waiting for a response from the administrative node (step 306), if the service node does not receive a response in a selected interval of time, the duration of the interval is increased (step 332). The process then returns to step 304 where another boot request is sent to the administrative node.

Figure 5:
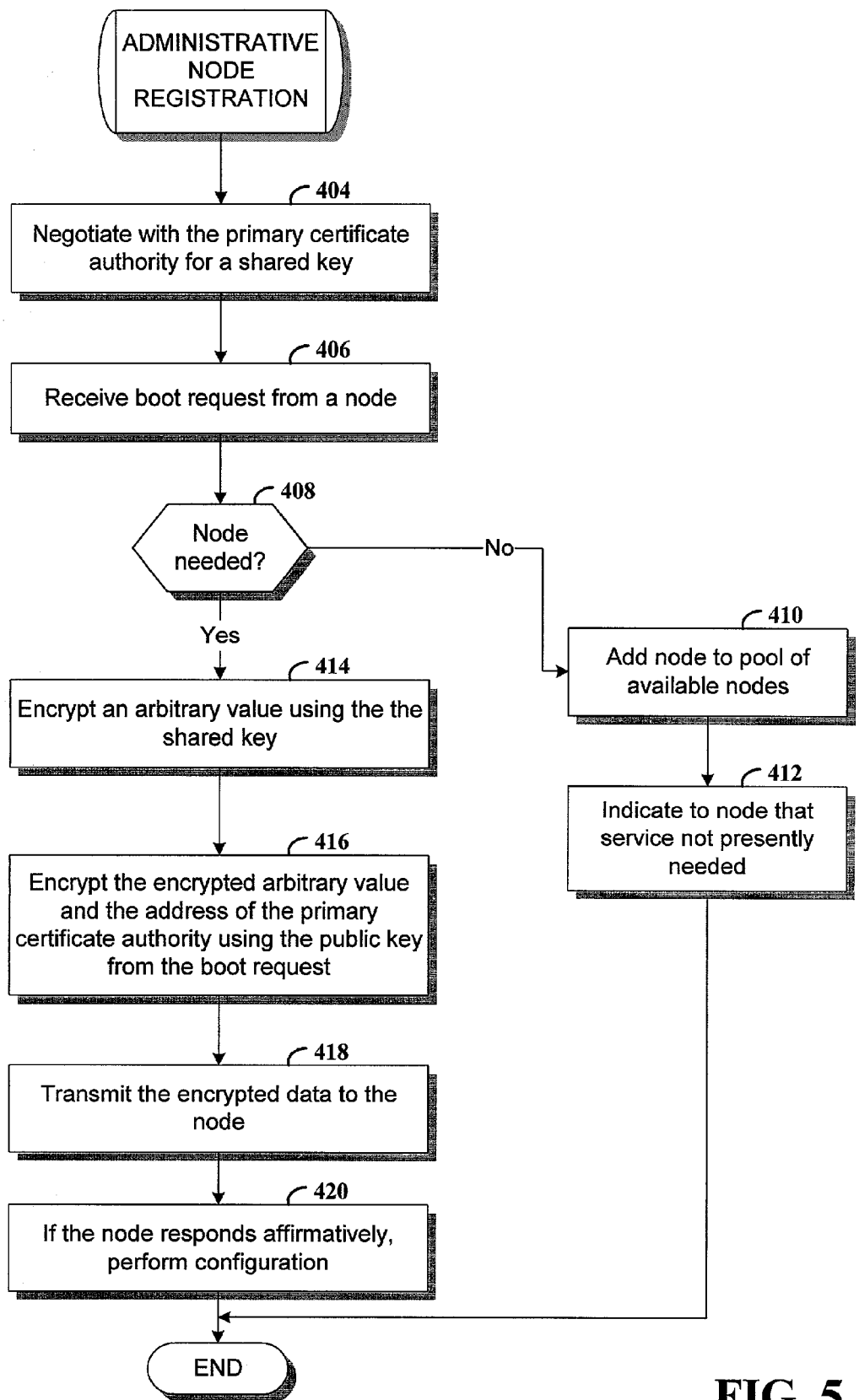
FIG. 5 is a flowchart of a process performed by an administrative node in registering a service node.

FIG. 5 is a flowchart of a process performed by an administrative node in registering a service node. Prior to receiving boot requests from service nodes, the administrative node negotiates (step 404) with the primary certificate authority for a shared key. In one embodiment, a known key exchange protocol such as the Internet Key Exchange Protocol is used.

Upon receiving a boot request from a node (step 406), the administrative node determines whether the node is needed (decision step 408). If the services of the node are not required, the identity of the node is saved in a pool of available nodes (step 410), and a response is returned to the node (step 412) indicating that service is not presently required.

If the node's service is needed, the administrative node encrypts (step 414) an arbitrary value using the key negotiated with the primary certificate authority. The encrypted arbitrary value and further information is then encrypted using the public key of the service node (step 416). The additional data that are encrypted include the address of the primary certificate authority and data that describe the configuration offered to the service node. The encrypted data are then transmitted to the service node (step 418). If the service node accepts the offer of configuration, the administrative node provides the necessary data (step 420); otherwise, no further action is taken with the service node.

In addition to the example embodiments described above, other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for identification of a service node coupled to an administrative node and a certificate authority node via a computer network, the administrative and certificate authority nodes having respective public and private keys, comprising:

establishing a shared key between the certificate authority node and the administrative node;

while booting the service node, automatically generating by the service node a public key and a private key for the service node;

sending a request from the service node to the administrative node, the request including the public key of the service node and indicating to the administrative node that the service node is available for configuration;

double encrypting, in response to the request from the service node, a selected value at the administrative node first using the shared key and second using the public key of the service node, whereby a double encrypted value is generated;

transmitting the double encrypted value to the service node;

decrypting the double encrypted value at the service node, whereby a single encrypted value is generated;

transmitting the single encrypted value to the certificate authority node;

decrypting the single encrypted value at the certificate authority node using the shared key;

generating an authentication code having a value that indicates whether the certificate authority node successfully decrypted the single encrypted value using the shared key;

transmitting from the administrative node to the service node configuration data that configures the service node to provide a selected service; and conditionally accepting the configuration data by the service node in response to the value of the authentication code.

2. The method of claim 1, further comprising:

transmitting from the administrative node to the service node data that indicate an offer to configure the service node to provide a selected service; and accepting the offer if the authentication code indicates successful authentication of the administrative node and other selected acceptance criteria are met.

3. The method of claim 1, wherein the service node includes a network interface card and further comprising generating the public key and private key of the service node on the network interface card.

4. The method of claim 3, further comprising storing the public key and private key of the service node on the network interface card.

5. The method of claim 3, further comprising:

encrypting at the administrative node using the public key of the service node an address that references the certificate authority node; and decrypting at the service node the address that references the certificate authority node, wherein the step of transmitting the single encrypted value to the certificate authority node uses the decrypted address that references the certificate authority node.

6. The method of claim 3, further comprising transmitting from the administrative node to the service node configuration data that configures the service node to provide a selected service.

7. The method of claim 3, further comprising:

transmitting from the administrative node to the service node data that indicate an offer to configure the service node to provide a selected service; and accepting the offer if the authentication code indicates successful authentication of the administrative node and other selected acceptance criteria are met.

8. An apparatus for identification of a service node coupled to an administrative node and a certificate authority node via a computer network, the administrative and certificate authority nodes having respective public and private keys, comprising:

means for establishing a shared key between the certificate authority node and the administrative node;

means for while booting the service node, automatically generating by the service node a public key and a private key for the service node;

means for sending a request from the service node to the administrative node, the request including the public key of the service node and indicating to the administrative node that the service node is available for configuration;

means, responsive to the request from the service node, for double encrypting a selected value at the administrative node first using the shared key and second using the public key of the service node, whereby a double encrypted value is generated;

means for transmitting the double encrypted value to the service node;

means for decrypting the double encrypted value at the service node, whereby a single encrypted value is generated;

means for transmitting the single encrypted value to the certificate authority node;

decrypting the single encrypted value at the certificate authority node using the shared key;

means for generating an authentication code having a value that indicates whether the certificate authority node successfully decrypted the single encrypted value using the shared key;

means for transmitting from the administrative node to the service node configuration data that configures the service node to provide a selected service; and means for conditionally accepting the configuration data by the service node responsive to the value of the authentication code.

9. A computing arrangement, comprising:

a network;

a certificate authority node coupled to the network;

an administrative node coupled to the network, the administrative node configured to establish a shared key with the certificate authority node; and a service node coupled to the network, the service node configured to automatically generate a public key and a private key for the service node while booting and send a request from the service node to the administrative node, the request including the public key of the service node and indicating to the administrative node that the service node is available for configuration;

wherein the administrative node is further configured to double encrypt a selected value first using the shared key and second using the public key of the service node in response to the request from the service node, whereby a double encrypted value is generated, transmit the double encrypted value to the service node, and transmit from the administrative node to the service node configuration data that configures the service node to provide a selected service, the service node is further configured to decrypt the double encrypted value, whereby a single encrypted value is generated, and transmit the single encrypted value to the certificate authority node, the certificate authority is further configured to decrypt the single encrypted value using the shared key and to generate an authentication code having a value that indicates whether the single encrypted value was successfully decrypted using the shared key, and the service node is further configured to conditionally accepting the configuration data in response to the value of the authentication code.

10. The arrangement of claim 9, wherein the administrative node is further configured to transmit to the service node data that indicate an offer to configure the service node to provide a selected service, and the service node is further configured to accept the offer if the authentication code indicates successful authentication of the administrative node and other selected acceptance criteria are met.

11. The arrangement of claim 9, wherein the service node includes a network interface card, and the network interface card generates the public key and private key of the service node.

12. The arrangement of claim 11, wherein the network interface is further configured for storage of the public key and private key of the service node.

13. The arrangement of claim 11, wherein the administrative node is further configured to encrypt, using the public key of the service node, an address that references the certificate authority node, and the service node is further configured to decrypt the address that references the certificate authority node.

* * * * *